(12) United States Patent  
Mansour et al.

(10) Patent No.: US 10,555,315 B1
(45) Date of Patent: Feb. 4, 2020

(54) INTERFERENCE MITIGATION IN HETEROGENEOUS NETWORKS

(71) Applicant: Sprint Spectrum LP, Overland Park, KS (US)

(72) Inventors: Nagi Mansour, Arlington, VA (US); Senthil Veeraragavan, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 459 days.

(21) Appl. No.: 14/873,546

(22) Filed: Oct. 2, 2015

(51) Int. Cl.
*H04W 72/08* (2009.01)
*H04W 16/32* (2009.01)
*H04W 24/02* (2009.01)
*H04W 88/02* (2009.01)

(52) U.S. Cl.
CPC ......... *H04W 72/082* (2013.01); *H04W 16/32* (2013.01); *H04W 24/02* (2013.01); *H04W 88/02* (2013.01)

(58) Field of Classification Search
CPC .... H04W 16/32; H04W 24/02; H04W 72/082
See application file for complete search history.

(56) References Cited

U.S. PATENT DOCUMENTS

| 8,412,256 | B2 | 4/2013 | Lee et al. | |
|---|---|---|---|---|
| 2011/0230219 | A1* | 9/2011 | Shores | H04L 5/0037 455/507 |
| 2013/0039293 | A1 | 2/2013 | Lin et al. | |
| 2013/0223268 | A1* | 8/2013 | Jung | H04J 11/005 370/252 |
| 2015/0358142 | A1* | 12/2015 | Lee | H04L 5/0044 370/252 |
| 2016/0127069 | A1* | 5/2016 | Nuss | H04W 16/10 370/329 |

* cited by examiner

*Primary Examiner* — Rhonda L Murphy

(57) ABSTRACT

Devices, systems, and methods to reduce interference in heterogeneous networks having a plurality of access nodes, such as combinations of macro cells, micro cells, pico cells, femto cells, etc. are disclosed. Interference caused in sectors of two or more access nodes that face each other is minimized by dividing a total number of resource blocks into resource block sets that are uniquely numbered and allocated across each sector of each access node. The allocation is rotated based on a different time stamp or a different starting number, or may be a random sequence of sets per access node. These independent allocations for each access node generally distribute the interference across the system, and provide better interference reduction, resulting in an increase in system capacity per sector of each cell.

20 Claims, 8 Drawing Sheets

INTERFERENCE MITIGATION IN HETEROGENEOUS NETWORKS

TECHNICAL BACKGROUND

A heterogeneous network can be configured to include various types of access nodes such as a macro access node, a micro access node, a pico access node, a femto access node, etc. In some heterogeneous networks, a wireless device at the edge of an access node coverage area can experience signal interference when frequencies are re-used by neighboring access nodes. Such interference may occur, for instance, at the edges of the access nodes due to overlapping with other access nodes. Such inter-cell interference (ICI) may degrade data transmission near coverage area edges, reducing data throughput and spectral efficiency to wireless devices near a coverage area edge. Existing methods to mitigate interference such as inter-cell interference coordination (ICIC) or scheduling schemes comprising almost blank subframes (ABS) require repeated communication between the cells, which increases overhead, or lose capacity due to muting resource blocks that could otherwise be used to carry traffic.

Overview

Exemplary embodiments described herein include systems, methods, and nodes for mitigating interference in heterogeneous networks. For instance, a method for mitigating interference in a wireless communication network comprises dividing a total number of resource blocks into a plurality of resource block sets, wherein one or more resource block sets from the plurality of resource block sets are allocated to each of a first access node and at least one additional access node that is proximate to the first access node, and rotating the allocation of said plurality of resource block sets for the first access node and said at least one additional access node. A system for mitigating interference in a wireless communication network comprises a processing node configured to determine one or more potential interference areas between a first access node and at least one additional access node, allocate a plurality of resource block sets across each of said first access node and at least one additional access node, each resource block set being assigned a resource block set number, and instruct each access node to rotate the allocation of the plurality of resource block sets starting from one or more of a different timestamp or a different resource block number. An access node in a wireless communication network comprises logic for mitigating interference in the wireless communication network by performing operations including determining a potential interference area between a sector of the access node and an overlapping sector of a neighboring access node, and rotating between resource blocks such that the sector of the access node that services the potential interference area uses a different resource block than the overlapping sector.

DETAILED DESCRIPTION

The disclosed embodiments illustrate devices, systems, and methods to reduce interference in heterogeneous networks having a plurality of access nodes, such as combinations of macro cells, micro cells, pico cells, femto cells, etc. Interference may be caused in sectors of two or more access nodes that face each other, and potentially overlap each other. The disclosed embodiments minimize this interference by dividing a total number of resource blocks available in a network into resource block sets (RBS) that are uniquely numbered and allocated across each sector of each access node. The allocation is rotated based on a different time stamp or a different starting number, so as to improve the odds of each facing sector that may potentially be subject to interference being assigned a different RBS number. The allocation may be a random sequence of RBS per access node. These independent allocations for each access node generally distribute the interference across the system, and provide better interference reduction compared to currently proposed techniques that require coordination between access nodes, or muting of resource blocks in the facing sectors. Further, the reduction in interference results in an increase in system capacity per sector of each cell.

Figure 1:
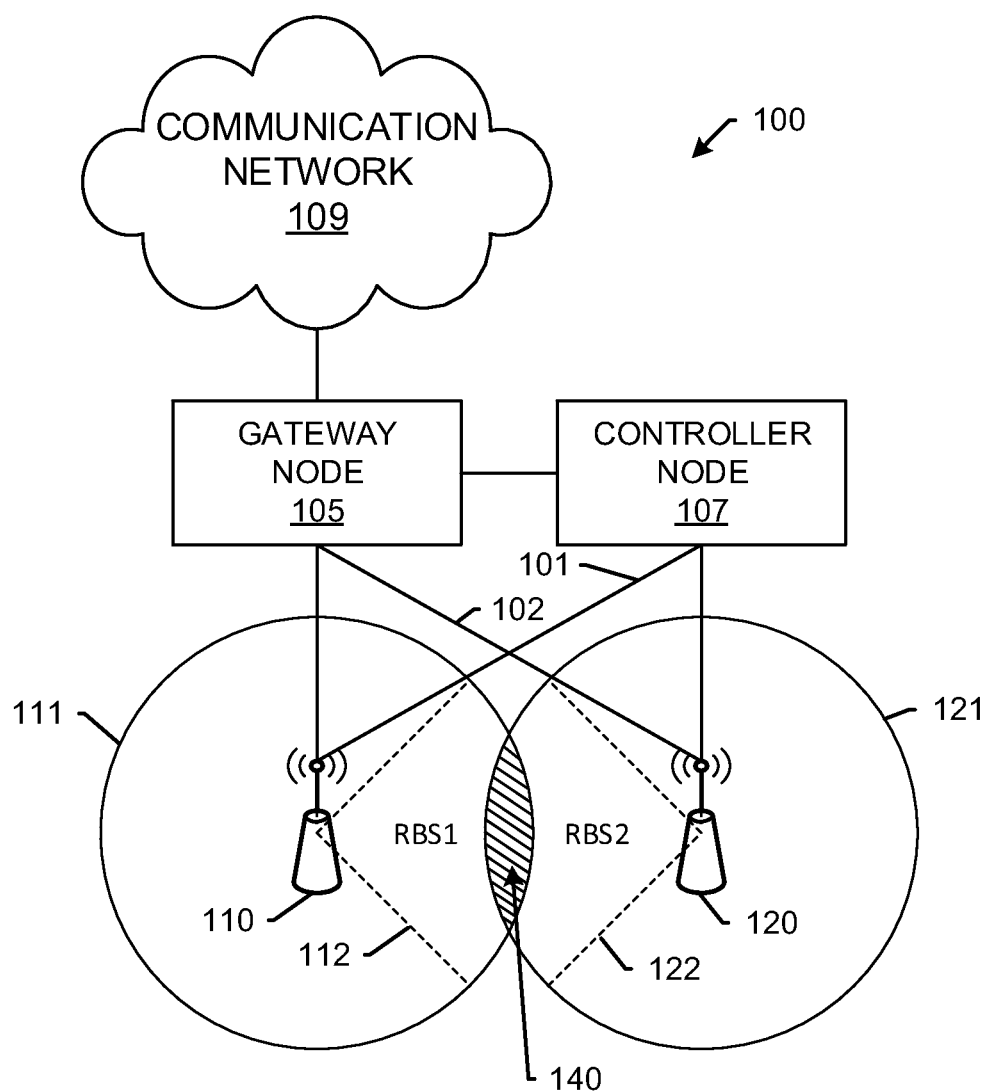
FIG. 1 illustrates an exemplary communication system for mitigating interference.

FIG. 1 illustrates an exemplary communication system 100 for mitigating interference. Communication system 100 can comprise access nodes 110 and 120 connected to gateway node 105 and controller node 107 via communication links 101 and 102, with gateway node 105 providing access to a communication network 109. Other network elements may be present in the communication system 100 to facilitate communication but are omitted for clarity, such as base stations, base station controllers, mobile switching centers, dispatch application processors, and location registers such as a home location register or visitor location register. Furthermore, other network elements may be present to facilitate communication, such as between access nodes 110, 120 and communication network 109 that are omitted for clarity, including additional processing nodes, controller nodes, routers, gateways, and physical and/or wireless data links for carrying data among the various network elements.

Communication network 109 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 109 can be capable of carrying data, for example, to support voice, push-to-talk, broadcast video, and data communications by a wireless device. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 109 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 109 can also comprise additional base stations, controller nodes, telephony switches, internet routers, network gateways, computer systems, communication links, or some other type of communication equipment, and combinations thereof.

Access nodes 110, 120 can be any network nodes configured to provide communication between wireless devices (not shown) and communication network 109. Access nodes 110, 120 can be standard access nodes and/or short range, low power, small access nodes. In an exemplary embodiment, access node 120 can be a small access node within at least a portion of an overlapping coverage area of access node 110, where access node 110 can be a standard access node. A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty five kilometers and an output power in the tens of watts. A small access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. It is noted that while two access nodes 110, 120 are illustrated in FIG. 1, any number of access nodes can be implemented within system 100.

Access nodes 110, 120 can comprise a processor and associated circuitry to execute or direct the execution of computer-readable instructions to obtain information. Access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 110, 120 can receive instructions and other input at a user interface. Access nodes 110, 120 communicate with gateway node 105 and controller node 107 via communication links 101, 102.

Communication links 101, 102 can use various communication media, such as air, space, metal, optical fiber, or some other signal propagation path—including combinations thereof. Communication links 101, 102 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Communication links 101, 102 can be a direct link or might include various equipment, intermediate components, systems, and networks. Communication links 101, 102 may comprise many different signals sharing the same link.

Moreover, access nodes 110, 120 provide service to wireless devices, including any device configured to communicate over communication system 100 using a wireless interface, such as a remote terminal unit, a cell phone, a smart phone, a computing platform such as a laptop, palmtop, or a tablet, a personal digital assistant, or an internet access device, and combinations thereof. The wireless interface of wireless devices can include one or more transceivers for transmitting and receiving data over communication system 100. Each transceiver can be associated with the same or different frequency bands, the same or different radio access technologies, the same or different network providers, and/or the same or different services. For example, wireless devices can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Gateway node 105 can be any network node configured to interface with other network nodes using various protocols. Gateway node 105 can communicate user data over system 100. Gateway node 105 can be a standalone computing device, computing system, or network component, and can be accessible, for example, by a wired or wireless connection, or through an indirect connection such as through a computer network or communication network. For example, gateway node 105 can include a serving gateway (SGW) and/or a public data network gateway (PGW), etc. One of ordinary skill in the art would recognize that gateway node 105 is not limited to any specific technology architecture, such as Long Term Evolution (LTE) and can be used with any network architecture and/or protocol.

Gateway node 105 can comprise a processor and associated circuitry to execute or direct the execution of computer-readable instructions to obtain information. Gateway node 105 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 105 can receive instructions and other input at a user interface.

Controller node 107 can be any network node configured to communicate information and/or control information over system 100. Controller node 107 can be configured to transmit control information associated with a handover procedure. Controller node 107 can be a standalone computing device, computing system, or network component, and can be accessible, for example, by a wired or wireless connection, or through an indirect connection such as through a computer network or communication network. For example, controller node 107 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 107 is not limited to any specific technology architecture, such as Long Term Evolution (LTE) and can be used with any network architecture and/or protocol.

Controller node 107 can comprise a processor and associated circuitry to execute or direct the execution of computer-readable instructions to obtain information. Controller node 107 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

In operation, as depicted in the exemplary embodiment of FIG. 1, access nodes 110 and 120 may be neighboring access nodes, which could lead to interference between transmissions of the access nodes 110 and 120 in certain situations. For example, sector 112 of access node 110 and sector 122 of access node 120 may overlap one another. The overlap area 140 may be termed a potential interference area. Wireless devices that receive transmissions from both access nodes 110 and 120 may experience interference cause, for instance, by sectors 112 and 122 utilizing the same over the air resources at the same time. Over the air resources may include, for instance, physical resource blocks representing a particular frequency subband at a particular time or time period. Thus, if sector 112 of access node 110 schedules use of a particular resource to a wireless device, it is possible for sector 122 of access node 120 to schedule use of the same resource at the same time, leading to interference for the wireless device. Such interference may be mitigated by allocating different sets of resources to each access node 110, 120, so that neighboring access nodes use different resources at a given time. However, real-time and ongoing allocation of resource blocks may require coordination between access nodes, as in the existing inter-cell interference coordination (ICIC) methods. Moreover, although interference is mitigated communication services provided by the access node and sectors thereof are less efficient because fewer resources are available to each access node.

Embodiments disclosed herein, such as that depicted in FIG. 1, propose a novel solution whereby a total number of resource blocks available in a network such as within system 100 may be divided into a plurality of resource block sets (RBS) that are uniquely numbered and allocated across each sector of each access node 110, 120. The allocation is rotated based on a different time stamp or a different starting number, such that each facing sector 112, 122, that may potentially be subject to interference, is assigned a different RBS, such as RBS1 and RBS2. As described herein, the allocation may be rotated among all sectors of all access nodes, or between specific access nodes, or a subset of a plurality of resource block sets may be allocated to each access node. The allocation may be a random sequence of RBS per access node. These independent allocations for each access node generally distribute the interference across the system, and provide better interference reduction compared to currently proposed techniques that require coordination between access nodes, or muting of resource blocks in the facing sectors.

Moreover, a potential interference area 140 may be indicated to one or more of access nodes 110, 120, via controller node 107 or another network element. The potential interference area 140 may be any portion of a sector of each access node that overlaps a sector of at least one additional access node. Alternatively or in addition, a rotation of allocation of resource block sets may be triggered by an indication of interference from a user equipment (UE) located in potential interference area 140. This feature may be extended to receiving an indication of a second potential interference area (as further depicted herein) caused by a second additional access node, and repeating the dividing and rotating steps for all access nodes, so as to distribute the interference and minimize repeated interference in the same region. Further, one or more of access nodes 110, 120 may comprise logic for performing operations including determining a potential interference area 140 between sectors 112 and 122, and rotating between resource block sets (RBS) assigned to access nodes 110 or 120, such that sectors 112 and 122 that service the potential interference area 140 use different resource block sets, such as RBS1 and RBS2.

Figure 2:
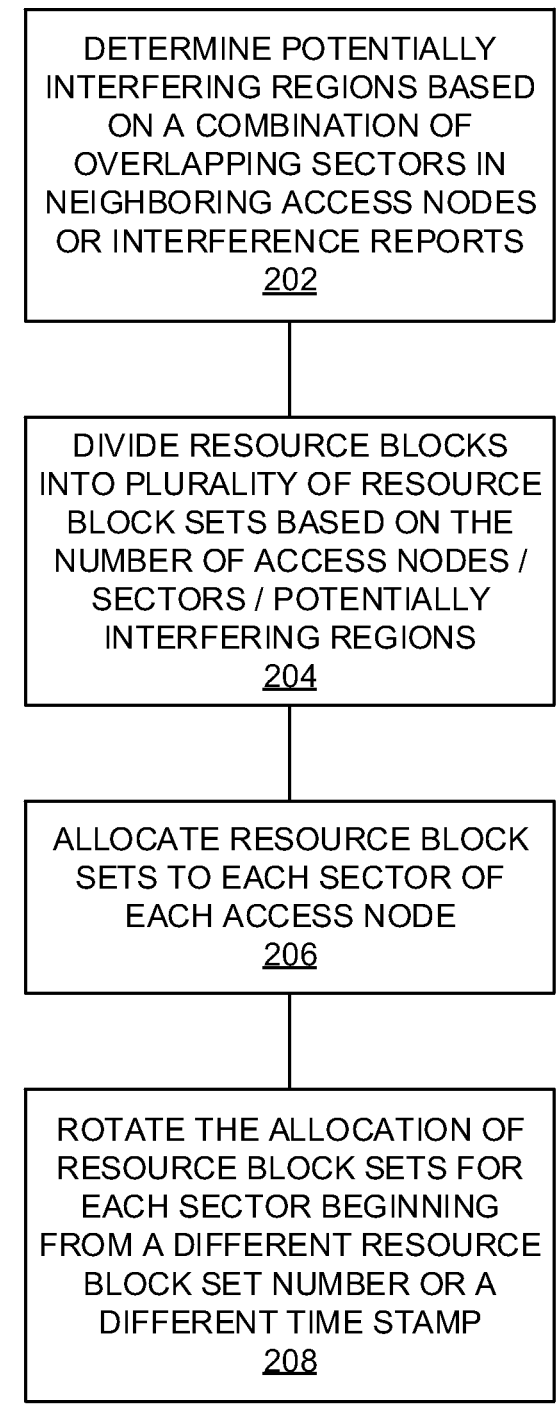
FIG. 2 illustrates an exemplary method for mitigating interference.

FIG. 2 illustrates an exemplary method for mitigating interference. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 202, a determination is made as to whether interference mitigation is needed. This determination is based on whether or not a potentially interfering region exists between access nodes. Potentially interfering regions may be determined based on, for example, overlapping sectors 112 and 122 between neighboring access nodes 110 and 120. If a network operator installs a new access node, then a potentially interfering region may be determined based on the location of the new access node, a range of the access node, or any combination of location and range with respect to a sector size and potential overlap of sectors between access nodes. Such a determination is helpful in subsequent steps such as dividing resource blocks into sets 204 or allocating resource block sets 206, as further described below.

Potentially interfering regions such as region 140 may further be determined via an interference indication or report received from a UE within the region. For example, wireless devices in communication with access nodes 110, 120 can experience interference if they are located in the overlapping region 140, and a signal condition of the wireless devices in communication with access nodes 110, 120 may be determined. The signal condition can be indicative of a signal quality and/or signal strength and be based on a signal characteristic. For example, the signal condition can be based on at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference ratio (SNIR), and signal to quantization noise ratio (SQNR). If sufficient interference is detected, for instance if the received interference reports/indicators exceed a threshold, then a determination is made as to the presence of a potentially interfering region.

At 204, resource blocks available within system 100 are divided into a plurality of resource block sets. The number of sets varies, and may depend on the number of access nodes in the system, the number of sectors, the number of potentially interfering regions, historical throughput for each access node or sector, and other factors. For example, a 20 MHz LTE network may include 100 resource blocks, which can be divided into 20 resource block sets of 5 resource blocks each, and the 20 RBS may be allocated among the various sectors of one or more eNodeBs. Any other division and allocation scheme may be appropriate, depending on the circumstances, and may be evident to those having ordinary skill in the art in light of this disclosure. Ideally, all resource blocks are used, so that no resource blocks are wasted. Further, each block is uniquely numbered, so that the unique RBS numbers can be rotated among the sectors as further described herein.

At 206, the RBS are allocated to the sectors. The RBS may be allocated based on a number of sectors 112, 122, a number of antennas in each access node, a number of potentially interfering regions 140, etc. This allocation may be assigned based on instructions from a controller node 107, from communication network 109, or from logic within one or both of access nodes 110, 120. Then, at 208, the allocation is rotated. The rotation may occur as needed; for instance, when additional resource blocks are needed in different sectors depending on usage, etc. This rotation may occur independently at each access node 110, 120, or may be based on instructions from a controller node 107 or other network entity. Notably, the rotation of allocations is performed independently at each access node 110, 120, with no need for communication or coordination between access nodes 110 and 120. The scheduling scheme can be communicated to a second and third access node at 204. At a maximum, the allocation scheme may be communicated to all access nodes, either directly or from controller node 107. The allocation scheme may further include instructions to begin the rotation at a different time stamp for each access node. Alternatively or in addition, the allocation scheme may include instructions to begin the rotation at a different RBS number for each access node. The allocation and rotation scheme may also be random. These allocations ensure that interference is minimized across potentially interfering regions, as further described herein and with references to FIGS. 4-7.

Figure 3:
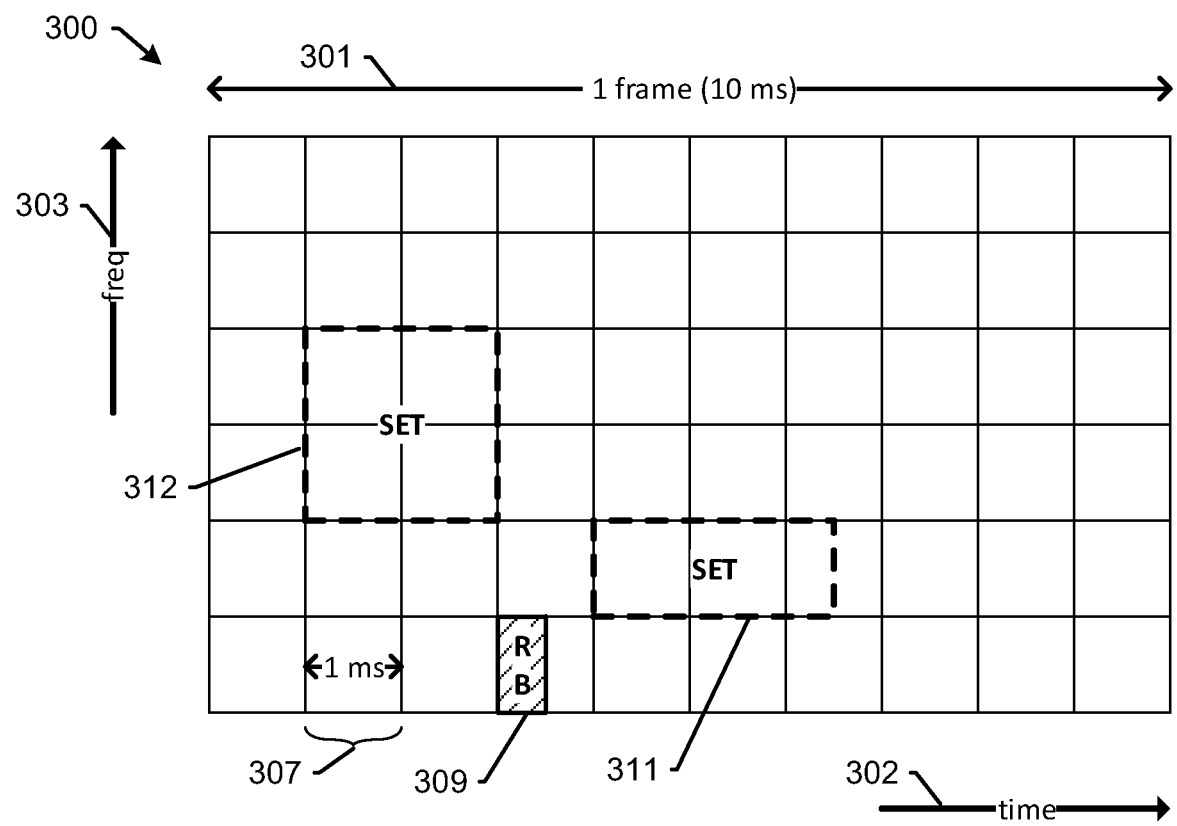
FIG. 3 illustrates exemplary resource block sets within an LTE radio frame.

FIG. 3 illustrates exemplary resource block sets within an LTE radio frame. As is generally known in the art, an LTE radio frame, such as frame 300, is 10 ms in duration, and comprises 10 subframes 307, each of which is 1 ms long. A subframe comprises two resource blocks (RBs), such as RB 309, each of which is 0.5 ms in duration. Further, each RB has a bandwidth of 180 kHz and, although six blocks are depicted along the frequency axis 303, more may be included and are not depicted for reasons of clarity. On a 10 Mhz carrier, for instance, 50 blocks may be used, and on a 20 MHz carrier, 100 blocks may be used.

For the purposes of the subject disclosure, a plurality of RBs 309 may be grouped into one or more resource block sets (RBS), such as RBS 311, 312. RBS 311 is a resource block set comprising 5 RBs, as described above, and RBS 312 comprises 8 RBs. Any grouping may be used depending on a number of access nodes and sectors that the RBS are allocated to, and all available RBs may be grouped into one of several RBS. The grouping of RBS can further be based on various factors such as the amount of information to be sent in the downlink to wireless devices in communication with each access node, a load on each access node, a load on the network, and an application requirement of an application running on a wireless device in communication with an access node. The load on each access node can comprise a number of wireless devices in communication with each access node, a total amount of data addressed to all wireless devices in communication with each access node, a utilization of resource blocks in a frame, carrier or channel, an amount of uplink and/or downlink traffic associated with each wireless device, the total bandwidth available for scheduling communication at each access node, etc. The load on the network can comprise a total amount of traffic associated with each network node in the backhaul of system 100, a throughput of each network node, a processing load at each network node, and any delay associated with each network node.

Figure 4A:
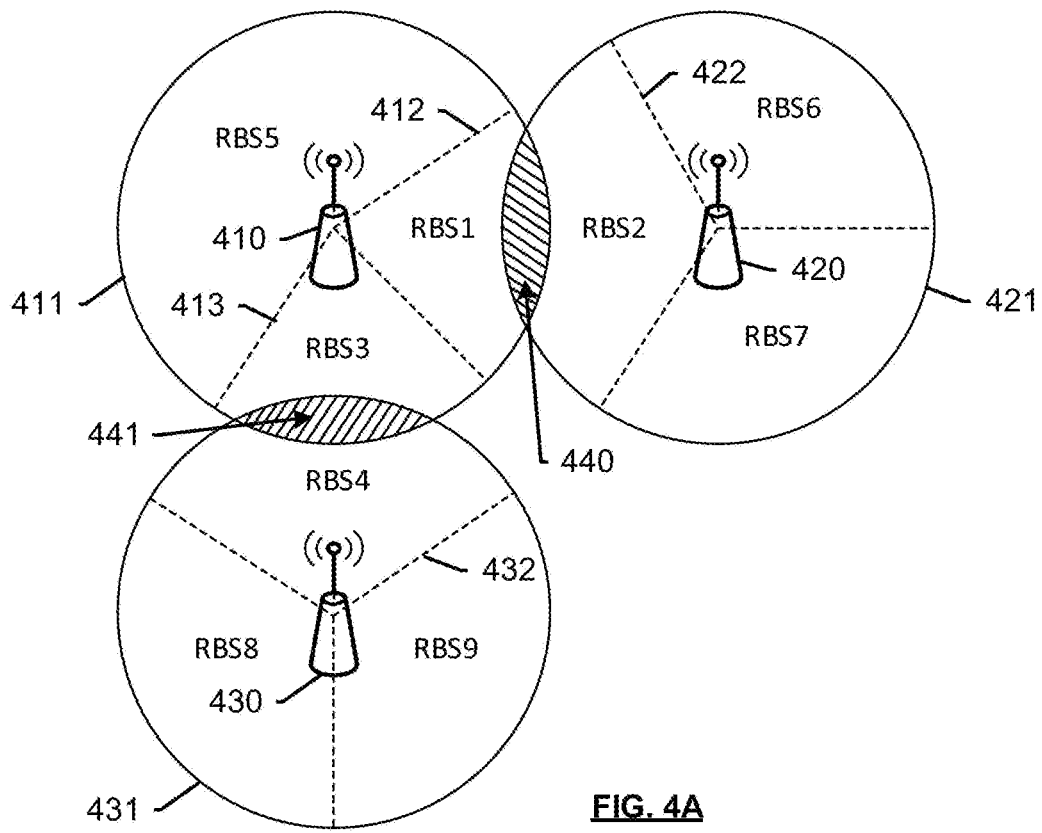
FIGS. 4A and 4B illustrate exemplary allocation of resource block sets among access nodes to mitigate interference.
Figure 4B:
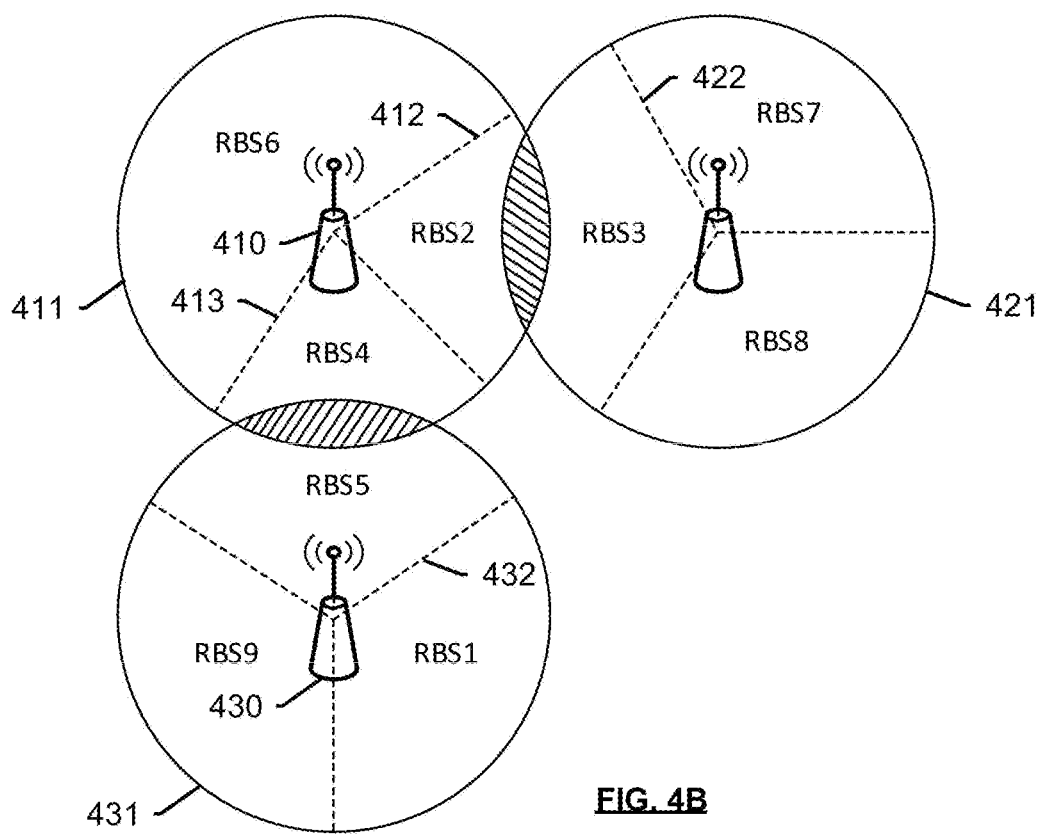

FIGS. 4A and 4B illustrate exemplary allocation of resource block sets among access nodes to mitigate interference. With respect to both FIGS. 4A and 4B, access nodes 410, 420, and 430 have 3 sectors each, and share the same total resources that are divided in resource blocks RBS1 . . . RBS9. Each access node 410, 420, and 430 has a corresponding signal range 411, 421, and 431. The ranges 411, 421, and 431 overlap in potential interference area 440, between sector 412 of access node 410 and sector 422 of access node 420, and potential interference area 441, between sector 412 of access node 410. Therefore, potential interference areas 440, 441 may be determined either by a proximity or distance of access nodes 410, 420, 430, or by interference reports, or any other means to indicate interference or a potential source of interference.

Referring to FIG. 4A, the allocation of resource block sets is such that in each potential interference area 440, 441, the serving sectors 412 and 422 have been assigned different sets RBS1 and RBS2, and the serving sectors 413 and 432 have been assigned different sets RBS3 and RBS4. Therefore, any potential interference in these regions is mitigated. Now, referring to FIG. 4B, the allocation of resource blocks has been rotated between all access nodes 410, 420, 430, such that the potential interference areas 440, 441 continue to be served by sectors having different resource block sets. For instance, as shown in the figure, sectors 412 and 422 now use RBS2 and RBS3 respectively, and sectors 413 and 432 now use RBS4 and RBS5, respectively. In other words, the allocation of RBS has hopped across different nodes, while minimizing interference. Various additional combinations may be conceivable to those having ordinary skill in the art in light of this disclosure. Further, although the allocation in these access nodes 410, 420, and 430 can use all resource block sets in all sectors, there may be embodiments where specific resource block sets are allocated to specific access nodes.

Figure 5A:
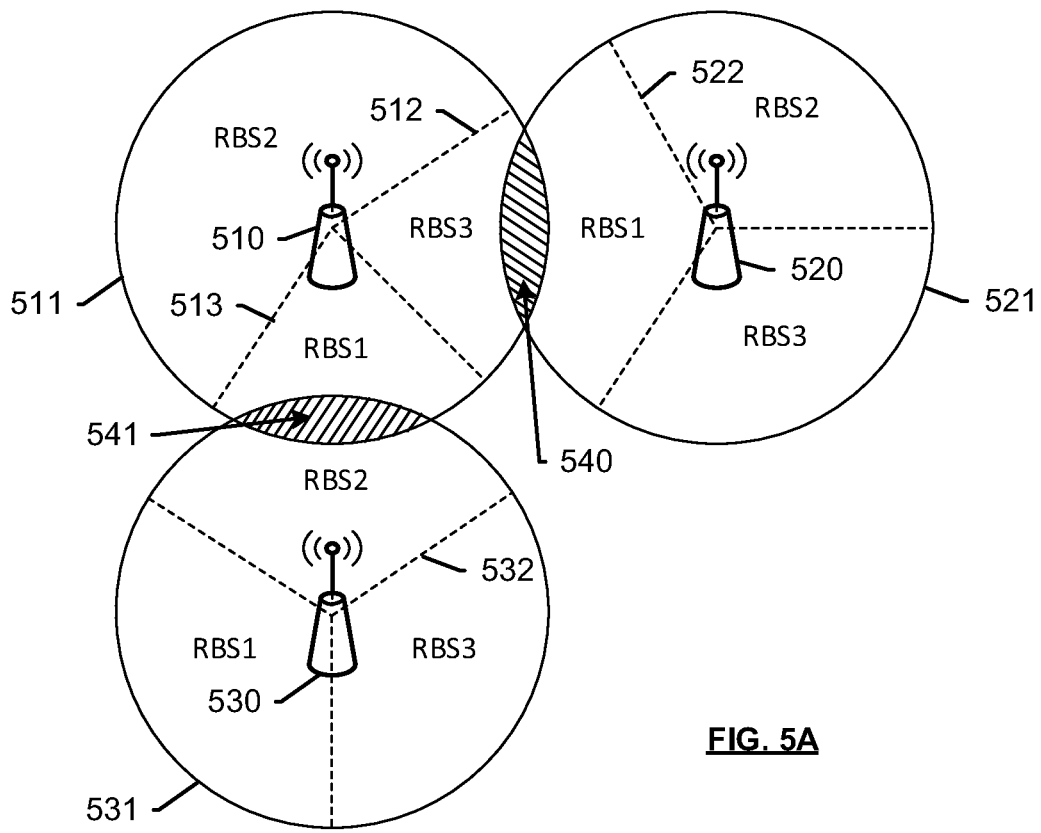
FIGS. 5A and 5B illustrate an additional exemplary allocation of resource block sets among access nodes to mitigate interference.
Figure 5B:
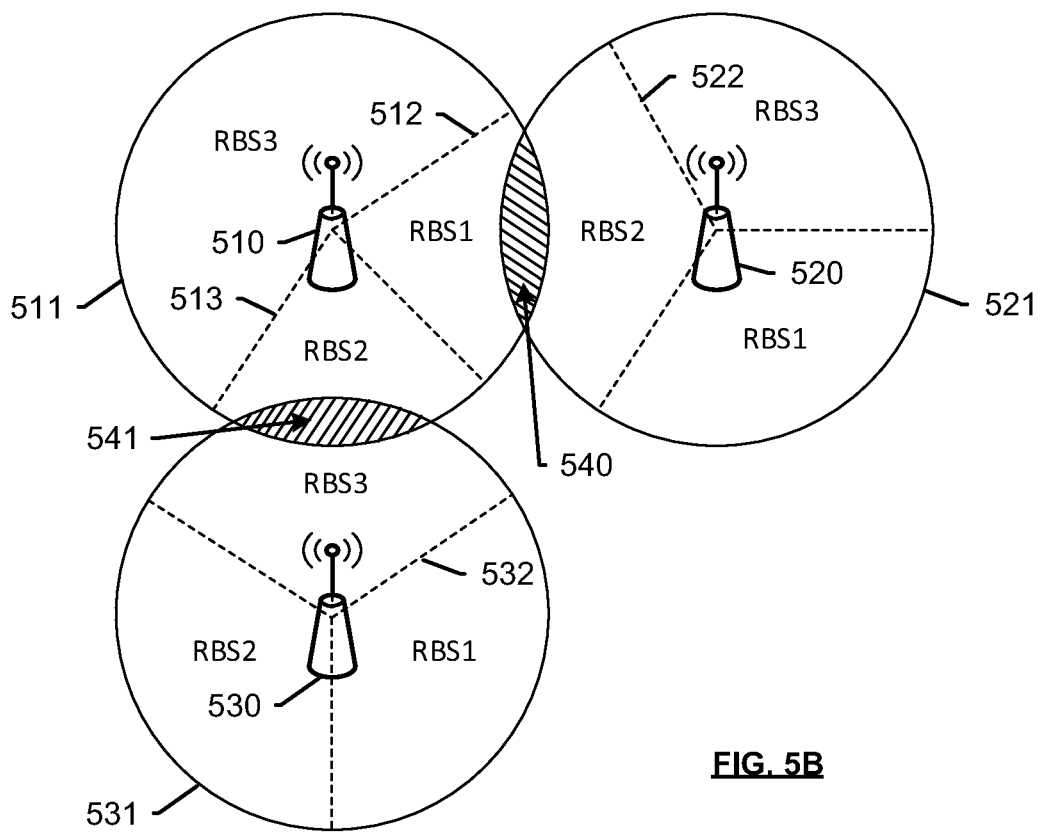

FIGS. 5A and 5B illustrate an additional exemplary allocation of resource block sets among access nodes to mitigate interference. With respect to both FIGS. 5A and 5B, access nodes 510, 520, and 530 have 3 sectors each. Each access node 510, 520, and 530 has a corresponding signal range 511, 521, and 531. The ranges 511, 521, and 531 overlap in potential interference area 540, between sector 512 of access node 510 and sector 522 of access node 520, and potential interference area 541, between sector 512 of access node 510. Therefore, potential interference areas 540, 541 may be determined either by a proximity or distance of access nodes 510, 520, 530, or by interference reports. In this embodiment, however, access nodes 510, 520, and 530 share resources that are divided in resource blocks RBS1, RBS2, and RBS3. In other words, all available resource blocks are divided into 3 sets. In this way, the same resources can be used by different sectors without being subject to interference.

For instance, referring to FIG. 5A, the allocation of resource block sets is such that in each potential interference area 540, 541, the serving sectors 512 and 522 have been assigned different sets RBS3 and RBS1, and the serving sectors 513 and 532 have been assigned different sets RBS1 and RBS2. Therefore, any potential interference in these regions is mitigated. Now, referring to FIG. 5B, the allocation of resource blocks has been rotated between all access nodes 510, 520, 530, such that the potential interference areas 540, 541 continue to be served by sectors having different resource block sets. For instance, as shown in the figures, sectors 512 and 522 now use RBS1 and RBS2 respectively, and sectors 513 and 532 now use RBS2 and RBS3, respectively. Moreover, each sector within a single access node uses different resource blocks. Various additional combinations may be conceivable to those having ordinary skill in the art in light of this disclosure.

Figure 6:
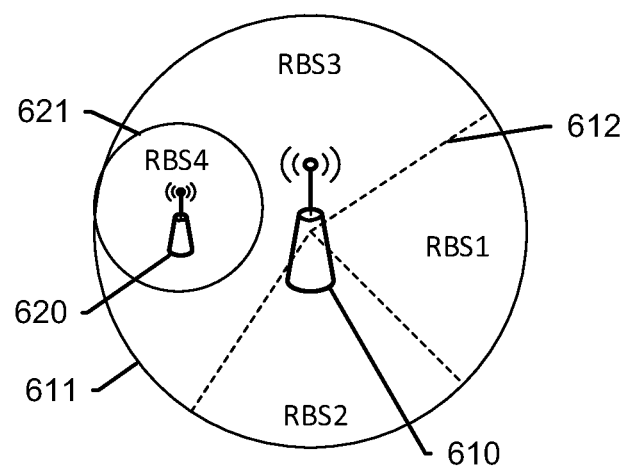
FIG. 6 illustrates a third exemplary allocation of resource block sets among access nodes to mitigate interference.

FIG. 6 illustrates a third exemplary allocation of resource block sets among access nodes to mitigate interference. In this embodiment, an access node 620 is a small cell access node that is completely within the range of a macro cell access node 610, and enclosed within sector 612 of macro cell access node 610. Therefore, any allocation within sector 612 that is the same as allocated to any sector of small cell access node 620 will result in interference. In this scenario, resource block sets are allocated such that the allocation of sector 612 of access node 610 is different than that of small cell access node 620. During rotation of allocations, the resource block assignments may overlap, in which case another rotation may have to be performed until there is no interference. In either case, the ongoing rotation may be performed with minimal to no communication between access nodes 610 and 620, unlike prior art methods.

Figure 7A:
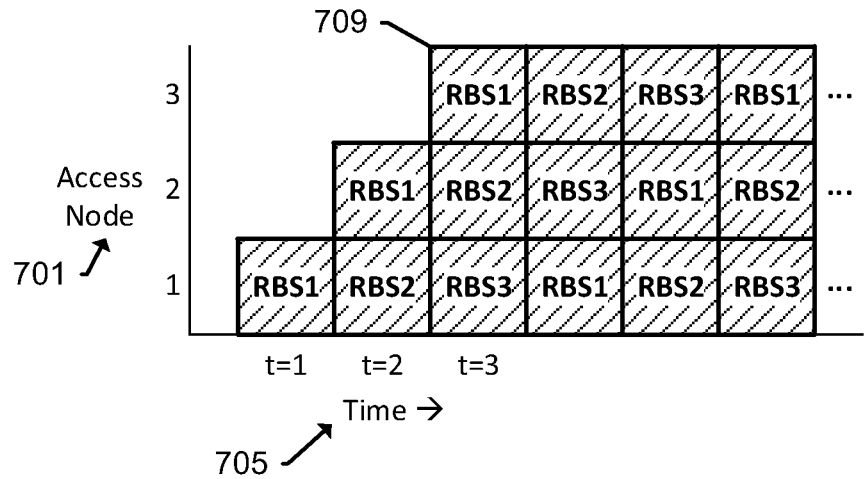
FIGS. 7A and 7B illustrate exemplary allocations of resource block sets based on a time stamp and a resource block set number, respectively.
Figure 7B:
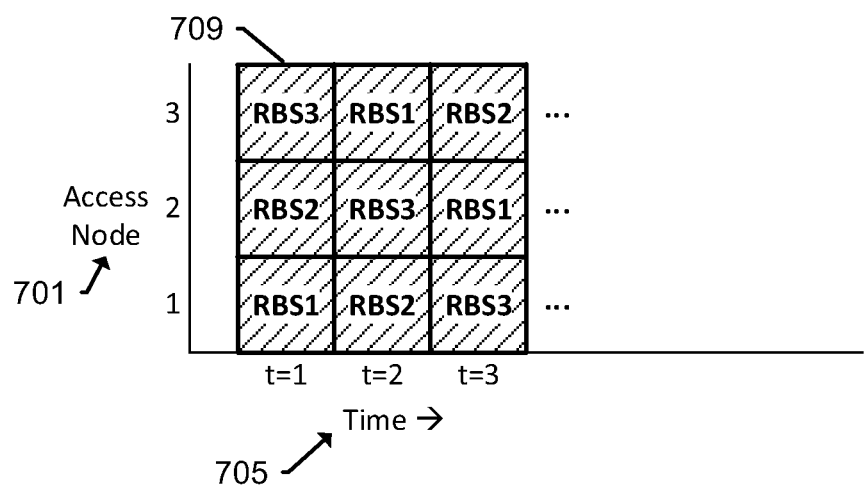

FIGS. 7A and 7B illustrate exemplary allocations of resource block sets based on a time stamp and a resource block set number, respectively. With respect to FIG. 7A, access nodes 1, 2, 3 are allocated resource block sets 709 based on different time stamps 705. Specific sectors of each access node 1, 2, 3 may be assigned these blocks to prevent interference. For instance, a potentially interfering sector within access node 1 is allocated resource block RBS1 at timestamp t=1, RBS2 at t=2, and RBS3 at t=3. A potentially interfering sector within access node 2 is allocated the same resource block sets in the same order, but with a different time stamp. That is, the sector within access node 2 is allocated resource block RBS1 at timestamp t=2, RBS2 at t=3, and so on. Therefore, the potentially interfering sectors of access nodes 1 and 2 will never share the same resource block at the same time. Similarly, a potentially interfering sector within access node 3 is allocated the same resource block sets in the same order, but with a different time stamp. That is, the sector within access node 3 is allocated resource block RBS1 at timestamp t=3, and so on.

Referring to FIG. 7B, access nodes 1, 2, 3 are allocated resource block sets 709 based on the same time stamp 705, but in a different order, or starting from a different RBS number. For instance, a potentially interfering sector within access node 1 is allocated resource block RBS1 at timestamp t=1, RBS2 at t=2, and RBS3 at t=3. A potentially interfering sector within access node 2 is allocated resource block RBS2 at timestamp t=1, RBS3 at t=2, and RBS1 at t=3. Similarly, a potentially interfering sector within access node 3 is allocated resource block RBS3 at timestamp t=1, RBS1 at t=2, and RBS2 at t=3, and so on. Therefore, the potentially interfering sectors of access nodes 1, 2, and 3 will never share the same resource block at the same time.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 8:
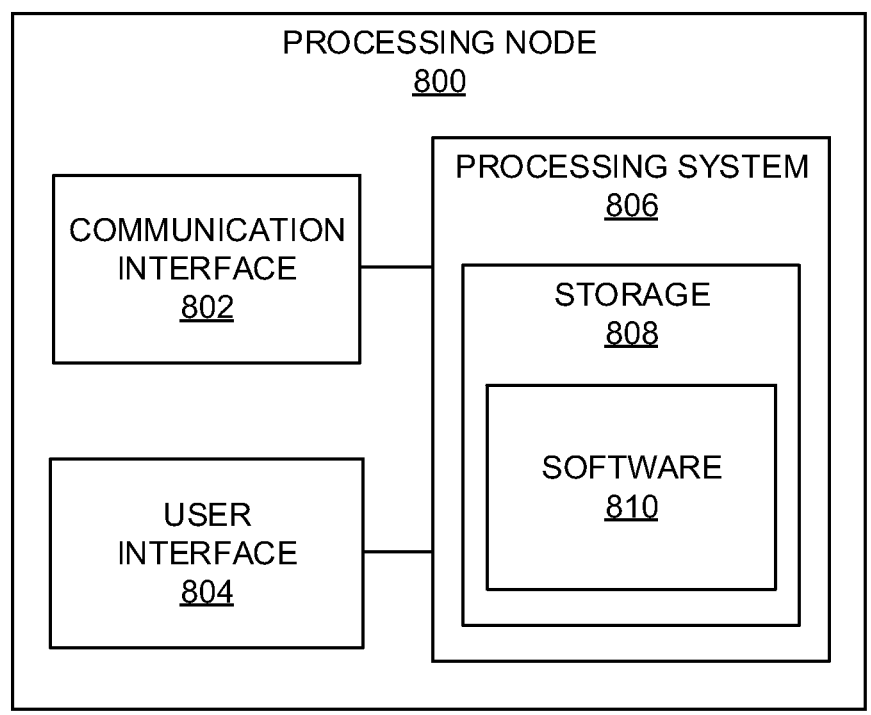
FIG. 8 illustrates an exemplary processing node.

FIG. 8 illustrates an exemplary processing node 800 comprising communication interface 802, user interface 804, and processing system 806 in communication with communication interface 802 and user interface 804. Processing node 800 is capable of paging a wireless device and communicating with access nodes via communication interface 802. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

An example of processing node 800 includes access node 110. Processing node 800 can also be an adjunct or component of a network element, such as an element of access node 110, access nodes 120, 410, 610, 620, gateway 105, controller node 107, a mobility management entity, a gateway, a proxy node, a wireless device or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion.

The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for mitigating interference in a wireless communication network, the method comprising:
    dividing, at a controller node in communication with a plurality of access nodes in the wireless network, a total number of resource blocks into a plurality of resource block sets, wherein a number of resource block sets of the plurality of resource block sets is based on a number of potential interference areas between one or more of the plurality of access nodes;
    subsequent to the dividing, allocating, by the controller node, one or more resource block sets from the plurality of resource block sets in the same order to each of a first access node from the plurality of access nodes and at least one additional access node that is proximate to the first access node;
    transmitting, from the controller node to the first access node, an instruction to allocate a resource block set at a first time stamp; and
    transmitting, from the controller to the at least one additional access node, an instruction to allocate the resource block set at a second time stamp, different from the first time stamp.

2. The method of claim 1, wherein each resource block set is assigned a unique resource block set number.

3. The method of claim 1, further comprising determining a potential interference area in a region between the first access node and said at least one additional access node.

4. The method of claim 3, wherein the potential interference area is any portion of a sector of the first access node that overlaps a sector of the at least one additional access node.

5. The method of claim 3, further comprising receiving an indication of interference from a user equipment (UE) located in the potential interference area.

6. The method of claim 5, wherein allocation of the resource block set at different time stamps is triggered by the indication of interference.

7. The method of claim 3, wherein the allocation of the resource block set at different time stamps is triggered by a positive determination of said potential interference area.

8. The method of claim 3, further comprising:
    receiving an indication of a second potential interference area caused by a second additional access node; and
    repeating the dividing, allocating, and instructing steps for the first access node, the at least one additional access node, and the second additional access node.

9. The method of claim 1, wherein the first access node comprises a macro access node and the at least one additional access node comprises a small cell node.

10. The method of claim 1, further comprising:
    determining a presence of a new access node in the wireless network;
    determining one or more new potential interference areas between the new access node and the first access node or at least one additional access node; and
    repeating the dividing and receiving steps based on a new total number of potential interference areas.

11. A system for mitigating interference in a wireless communication network, the system comprising:
    a controller node; and
    a processor coupled to the controller node, the processor being configured to:
    determine one or more potential interference areas between a first access node and at least one additional access node;
    divide a total number of resource blocks into a plurality of resource block sets, wherein a number of resource block sets of the plurality of resource block sets is based on a number of the one or more potential interference areas;
    subsequent to the dividing, allocate the plurality of resource block sets to each of said first access node and at least one additional access node in the same order, each resource block set being assigned a resource block set number; and
    transmit an instruction to each access node to allocate the plurality of resource block sets at a different timestamp for each access node.

12. The system of claim 11, wherein the determination of the one or more potential interference areas is based on a pair of overlapping sectors of the first access node and the at least one additional access node.

13. The system of claim 11, wherein the determination of the one or more potential interference areas is based on a presence of the at least one additional access node within a range of a sector of the first access node.

14. The system of claim 11, wherein the determination of the one or more potential interference areas is based on receiving an indication of interference from a user equipment (UE).

15. The system of claim 11, wherein the processor is further configured to:
    receive an indication of a second potential interference area caused by a second additional access node; and
    allocate the plurality of resource block sets across each of said first access node, said at least one additional access node, and said second additional access node.

16. The system of claim 11, wherein the first access node comprises a macro access node and the at least one additional access node comprises a small cell node.

17. An access node in a wireless communication network, the access node comprising a processor and a memory, the memory to store logic for mitigating interference in the wireless communication network that is executed by the processor to perform operations comprising:
    determining potential interference areas between a sector of the access node and an overlapping sector of a neighboring access node;
    dividing a total number of resource blocks into a plurality of resource block sets, wherein a number of resource block sets of the plurality of resource block sets is based on a number of the potential interference areas;
    subsequent to the dividing, receiving, from a controller node in communication with the access node, an allocation of the resource block sets, the resource block sets being in the same order for each of the access node and the neighboring access node; and
    receiving, from the controller node, an instruction to allocate the resource block sets at a different time stamp from a second time stamp of the resource block sets from the neighboring access node, such that the sector of the access node that services the potential interference area uses a different resource block than the overlapping sector, wherein the resource block sets are randomly allocated per sector.

18. The access node of claim 17, wherein the access node comprises a macro access node, and the neighboring access node comprises a small cell node.

19. The access node of claim 18, wherein the small cell node is one of a microcell, a picocell, or a femtocell.

20. The access node of claim 17, wherein the determining of the potential interference areas is based on receiving an indicator of interference from one or more of a controlling node or a user equipment.

* * * * *